(12) United States Patent
Tanimoto et al.

(10) Patent No.: US 7,275,326 B2
(45) Date of Patent: Oct. 2, 2007

(54) PORTABLE ELECTRIC CUTTING APPARATUS

(75) Inventors: Hideyuki Tanimoto, Ibaraki (JP); Teruo Imai, Ibaraki (JP); Kenji Niwa, Ibaraki (JP); Takuya Konnai, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 70 days.

(21) Appl. No.: 11/039,965

(22) Filed: Jan. 24, 2005

(65) Prior Publication Data

US 2005/0160608 A1 Jul. 28, 2005

(30) Foreign Application Priority Data

Jan. 26, 2004 (JP) ............................ P2004-016936
Oct. 29, 2004 (JP) ............................ P2004-315190

(51) Int. Cl.
*B23D 45/16* (2006.01)
(52) U.S. Cl. ....................... 30/391; 30/123.3
(58) Field of Classification Search ............... 30/123.3, 30/124, 376, 377, 388, 389, 390, 391, 374; 83/98, 99, 168, 169
See application file for complete search history.

(56) References Cited

U.S. PATENT DOCUMENTS

| 3,267,974 A | | 8/1966 | Elson | |
|---|---|---|---|---|
| 3,873,862 A | * | 3/1975 | Butler | ..................... 144/222 |
| 4,612,734 A | * | 9/1986 | Nakajima et al. | ............ 451/358 |
| 5,084,971 A | | 2/1992 | Remington et al. | |
| 5,146,682 A | * | 9/1992 | Blochle et al. | ................ 30/390 |
| 5,327,649 A | * | 7/1994 | Skinner | ........................ 30/390 |
| 5,539,985 A | | 7/1996 | Wershe | |
| 5,634,274 A | | 6/1997 | Ohkouchi et al. | |
| 5,701,676 A | * | 12/1997 | Itoh | ............................. 30/388 |
| D400,417 S | * | 11/1998 | Moran, II | ..................... D8/70 |

(Continued)

FOREIGN PATENT DOCUMENTS

JP          55-154101          11/1980

(Continued)

OTHER PUBLICATIONS

English Translation of Notice of Reason for Rejection mailed Aug. 31, 2005.

(Continued)

*Primary Examiner*—Stephen Choi
(74) *Attorney, Agent, or Firm*—McGinn IP Law Group, PLLC

(57) ABSTRACT

A portable electric cutting apparatus includes a housing for housing an electric motor for rotating a saw blade a fan provided in the housing and driven by the electric motor, a saw cover attached to the housing and having a saw blade housing part having a shape to cover an upper half of the outer periphery of the saw blade for housing a part of the saw blade, a base formed with an opening for allowing the saw blade to project downward from a bottom face which is slidable on a cut material. A discharge passage for discharging a fan wind produced by driving the fan is formed along an outer periphery of the saw cover. The fan wind is discharged through the discharge passage toward a front side of the base in the cutting direction.

9 Claims, 7 Drawing Sheets

U.S. PATENT DOCUMENTS

| | | | |
|---|---|---|---|
| 6,173,499 B1 | 1/2001 | Hegoas et al. | |
| 6,918,331 B2* | 7/2005 | Okouchi | 30/391 |
| 6,981,779 B2* | 1/2006 | Fukuoka | 362/119 |
| 7,103,979 B2* | 9/2006 | Yoshida et al. | 30/391 |
| 2004/0107584 A1 | 6/2004 | Yoshida et al. | |
| 2004/0244203 A1* | 12/2004 | Otake | 30/124 |

FOREIGN PATENT DOCUMENTS

| | | | |
|---|---|---|---|
| JP | 6-83223 | | 11/1994 |
| JP | 2543298 | | 4/1997 |
| JP | 11058366 A | * | 3/1999 |
| JP | 3072537 | | 8/2000 |
| JP | 2607480 | | 6/2001 |
| JP | 2003-11101 | | 1/2003 |

OTHER PUBLICATIONS

Concise Statement of relevance for 2607480, 2543298, 2003-11101, 55-154101, 6-83223, and 3072537, Feb. 20, 2006.

* cited by examiner

PORTABLE ELECTRIC CUTTING APPARATUS

BACKGROUND OF THE INVENTION

1. Field of the Invention

The invention relates to a portable electric cutting apparatus of a portable circular saw, a portable jig saw, etc., having a fan for cooling an electric motor.

2. Description of the Related Art

FIGS. 12 and 13 show the configuration of a portable circular saw as an example of a portable electric cutting apparatus in a related art.

FIG. 12 is a broken plan view of a portable circular saw in a related art and FIG. 13 is a bottom perspective view of the portable circular saw on the rear thereof. The portable circular saw shown in the figures includes a saw blade 1, an electric motor 2 for rotating the saw blade 1, a motor housing 3 for housing the electric motor 2, a saw cover 4 for holding the saw blade 1 for rotation, and a base 5 placed below the motor housing 3 and the saw cover 4 and having an opening 5a for allowing the saw blade 1 to project from the lower face. The saw cover 4 is attached to the motor housing 3 and the base 5 is joined to the saw cover 4. A safety cover 6 having a shape covering the outer peripheral portion of the roughly semicircle part of the saw blade 1 is held on the saw cover 4 so as to be able to rotate concentrically with the saw blade 1.

The power of the electric motor 2 is transferred to the saw blade 1 via a gear (not shown), etc., and the saw blade 1 is rotated at predetermined speed. A fan 7 for cooling the electric motor 2 is attached to the electric motor 2. When the electric motor 2 is driven, the fan 7 rotates and fan wind 9 flowing into the inside of the motor housing 3 from a suction port 8 provided at the end part of the motor housing 3 on the opposite side to the saw cover 4 flows through the inside of the motor housing 3 for cooling the electric motor 2.

By the way, a wall placed between a saw blade housing part 4a of the saw cover 4 and the motor housing 3 is provided with a plurality of partition walls 4b forming a fan wind discharge port, and each of the partition walls 4b is provided with a slope part 4c of a shape to incline to the front in the cutting direction as it is toward the side end face of the saw blade 1.

The fan wind 9 flowing through the inside of the motor housing 3 passes through the partition walls 4b provided with the slope parts 4c, is discharged into the saw blade housing part 4a, is sprayed slantingly on the side of the saw blade 1 or the side of the safety cover 6, and is discharged toward the front of the opening 5a of the saw blade housing part 4a in the cutting direction with little changing the discharge direction to the front in the cutting direction.

As shown in FIG. 13, a groove part 5b communicating with the opening 5a is provided from the opening 5a to the end part of the base 5 on the bottom of the base 5, in the front portion of the opening 5a in the cutting direction. As shown in the figure, a guide piece 10 having a guide part 10a for pointing to the cutting edge of the saw blade 1 is provided at the front end part of the base 5 in the cutting direction. The guide piece 10 has a bottom positioned above the bottom of the base 5.

The groove part 5b is provided on the extension in the length direction of the saw blade 1 and has a dimension in the width direction set larger than the width dimension of the saw blade 1.

By the way, the fan wind 9 discharged into the range of the opening 5a by the slope parts 4c of the saw cover 4 blows against the top of a cut material positioned in the range of the opening 5a at the cutting work time and is diffused. The groove part 5b is provided on the bottom of the base 5 as described above, whereby the discharge direction is determined so that a part of the diffused fan wind 9 passes through the space between the groove part 5b and the top face of the cut material and is discharged along the top face of the cut material, and the wind is discharged into the front side in the cutting direction rather than the end part of the base 5. The fan wind 9 flowing out into the groove 5b passes through below the guide piece 10 and is discharged into the front side in the cutting direction rather than the end part of the base 5. The fan wind 9 makes it possible to remove chips accumulated on the mark-off line on the front side in the cutting direction rather than the end part of the base 5, so that it is made possible to easily check the correlation between the guide part 10a of the guide piece 10 and the mark-off line.

In cutting work using the portable circular saw, often a mark-off line is drawn on the top face of a cut material and cutting work is executed while the guide part 10a is matched with the mark-off line to improve the cutting accuracy and therefore making it possible to easily check the correlation between the guide part 10a and the mark-off line leads to improvement in workability. (Please see JP-A-2002-307696.)

SUMMARY OF THE INVENTION

However, in the configuration of the portable circular saw in the related art described above, the groove 5b needs to be provided on the bottom of the base 5 and thus the strength of the base 5 is a little degraded; this is a problem.

A configuration is possible wherein a tubular guide pipe is attached so as to communicate with a fan discharge port provided on a saw cover and fan wind is guided into the vicinity on a cut material by the guide pipe for preventing chips from accumulating on the cut material like a portable circular saw disclosed in JP-UM-A-55-154101. However, if such a configuration is adopted, the guide pipe hinders the worker from checking the positional relationship between the mark-off line and the cutting edge of the saw blade and thus the workability is degraded.

It is an object of the invention to provide a portable electric cutting apparatus for eliminating the disadvantages described above and using fan wind to scatter chips on a cut material without incurring degradation of the strength of a base, thereby making it possible to easily check the cutting edge of a saw blade and improve workability.

According to one aspect of the invention, there is provided with a portable electric cutting apparatus including: a housing for housing an electric motor rotating a saw blade and a fan driven by the electric motor; a saw cover attached to the housing, the saw cover including a saw blade housing part at least partially housing the saw blade and having a shape to cover an upper half of outer periphery of the saw blade; and a base joined to at least one of the saw cover and the housing, the base having an opening to allow the saw blade to project downward from a bottom face which is slidable on a cut material, wherein at least one discharge passage for discharging a fan wind generated by driving the fan is formed along an outer periphery of the saw cover, and the fan wind is discharged through the discharge passage toward a front side of the base in a cutting direction.

By thus configuration, the fan wind produced by driving the fan is discharged through the discharge passage toward the front side of the base in the cutting direction, so that the chips on the cut material on the front side of the base in the cutting direction can be blown off by the fan wind without incurring degradation of the strength of the base as a groove is formed on the bottom of the base; the viewability of a mark-off line on the cut material can be enhanced and the workability can be improved.

According to another aspect of the invention, a light emission part for applying light toward a front side of the cutting material in the cutting direction is formed on at least one of the discharge passage and a discharge path of the fan wind outside the discharge passage. By thus configuration, the light emission part is placed in the discharge passage or the discharge path of the fan wind outside the discharge passage, so that chips are hard to be deposited on the light emission part and the cut portion on the cut material can be kept in a state in which the viewability is good. Further, since the light emission part is cooled by the fan wind, heat generation of the light emission part is suppressed and degradation of the intensity of the light emission part is prevented. In addition, the power consumption can be decreased for power saving and an inexpensive light emission part having a low heatresistant temperature can be used to reduce the cost.

According to another aspect of the invention, the light emission part is configured by a laser oscillator.

By thus configuration, the light emission part is implemented as a laser oscillator.

According to another aspect of the invention, the laser oscillator is positioned such that laser light emitted by the laser oscillator is applied onto a cutting extension of the cut material. By thus configuration, the cut line of the cut material is explicitly indicated by laser light showing a high rectilinear propagation property and the cut material can be cut easily and precisely along the cut line.

According to another aspect of the invention, a discharge passage forming member for forming the discharge passage is attached to the saw cover.

According to another aspect of the invention, the discharge passage forming member is attached to the saw cover so as to at least partially cover a fan wind discharge port formed on an outer peripheral part of the saw cover.

According to another aspect of the invention, the discharge passage forming member is configured by a cover member which forms the discharge passage with an outer peripheral surface of the saw cover.

By thus configuration, the discharge passage forming member of the cover member, etc., is implemented as a separate body from the saw cover and is attached to the saw cover to form the discharge passage between the discharge passage forming member and the outer peripheral surface of the saw cover, so that the discharge passage can be formed for providing the advantage described above with little requiring working on an already existing product.

According to another aspect of the invention, a part of the discharge passage is formed by extending the discharge passage onto an extension in length direction of the saw blade. The fan wind is discharged to the front side in the cutting direction even at the inclined cutting time and blows off chips ahead in the cutting direction and occurrence of the disadvantage of accumulating chips on the cut material and hindering the viewability of the mark-off line can be prevented.

According to another aspect of the invention, the fan wind discharged through the discharge passage is discharged from a front end of the base in the cutting direction toward a front side. By thus cofiguration, the chips on the cut material can be blown off ahead from the cutting part and can be removed from the top of the cut material.

According to another aspect of the invention, there is provided a portable electric cutting apparatus including: a housing for housing an electric motor driving a saw blade and a fan driven by the electric motor; and a base having an opening to allow the saw blade to project downward from a bottom face which is slidable on a cut material, wherein at least one discharge passage for at least partially discharging a fan wind generated by driving the fan toward a front side of the base in a cutting direction is formed, and a light emission part for applying light toward a front side of the cut material in the cutting direction is formed in at least one of the discharge passage and a discharge path of the fan wind outside the discharge passage.

By thus configuration, the chips ahead in the cutting direction can be blown off by the fan wind and depositing chips on the light emission part can be prevented for keeping the cut portion on the cut material in a state in which the viewability is good.

According to another aspect of the invention, the light emission part is implemented as a laser oscillator.

According to another aspect of the invention, the laser oscillator is placed at a position such that laser light emitted by the laser oscillator is applied onto the cutting extension of the cut material. By thus configuration, the cut line of the cut material is explicitly indicated by laser light showing a high rectilinear propagation property and the cut material can be cut easily and precisely along the cut line.

DESCRIPTION OF THE PREFERRED EMBODIMENTS

Referring now to the accompanying drawings, there are shown preferred embodiments of the invention.

First Embodiment

Figure 1:
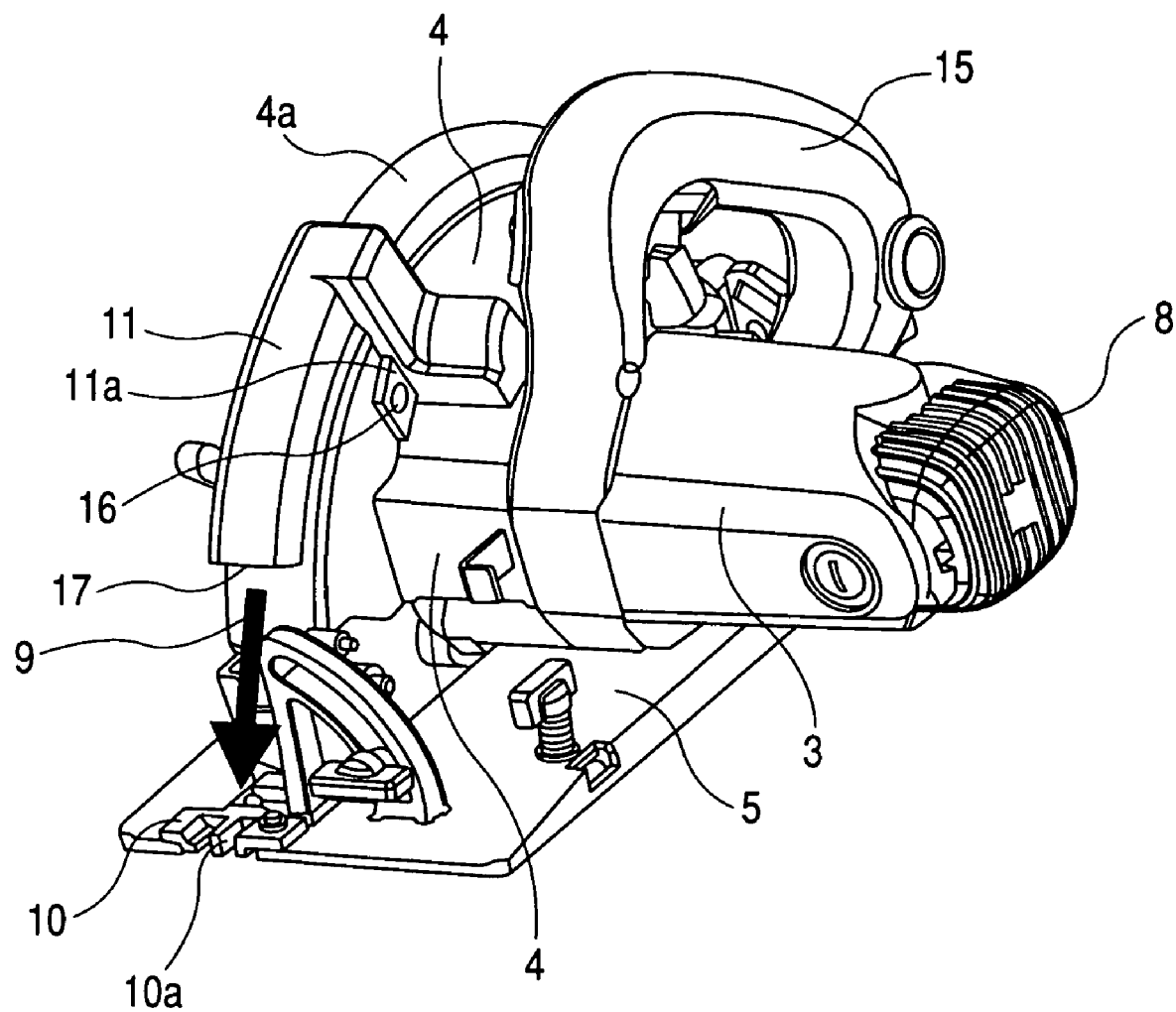
FIG. 1 is a perspective view of a portable circular saw according to a first embodiment of the invention.
Figure 2:
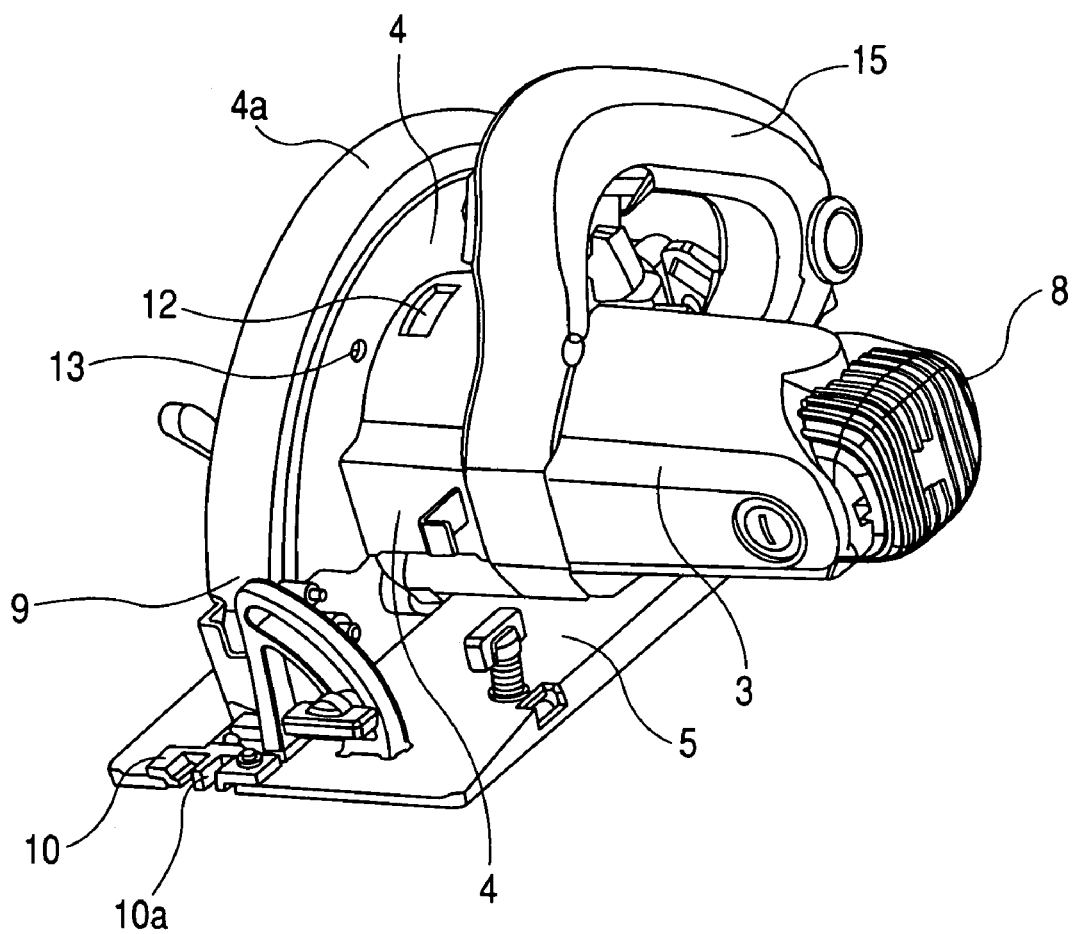
FIG. 2 is a perspective view to show a state in which a cover member of the portable circular saw is removed according to the first embodiment of the invention.
Figure 3:
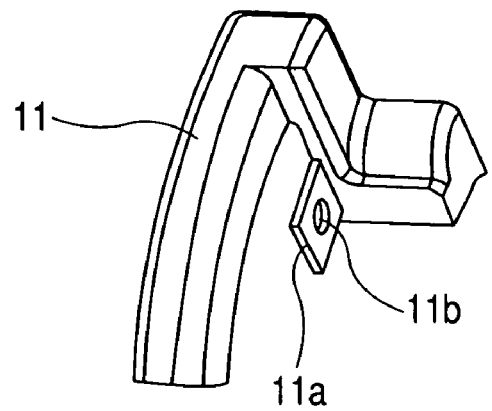
FIG. 3 is a top perspective view of the cover member of the portable circular saw according to the first embodiment of the invention.
Figure 4:
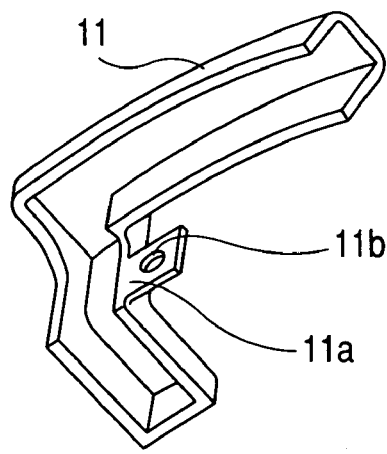
FIG. 4 is a bottom perspective view of the cover member of the portable circular saw according to the first embodiment of the invention.
Figure 5:
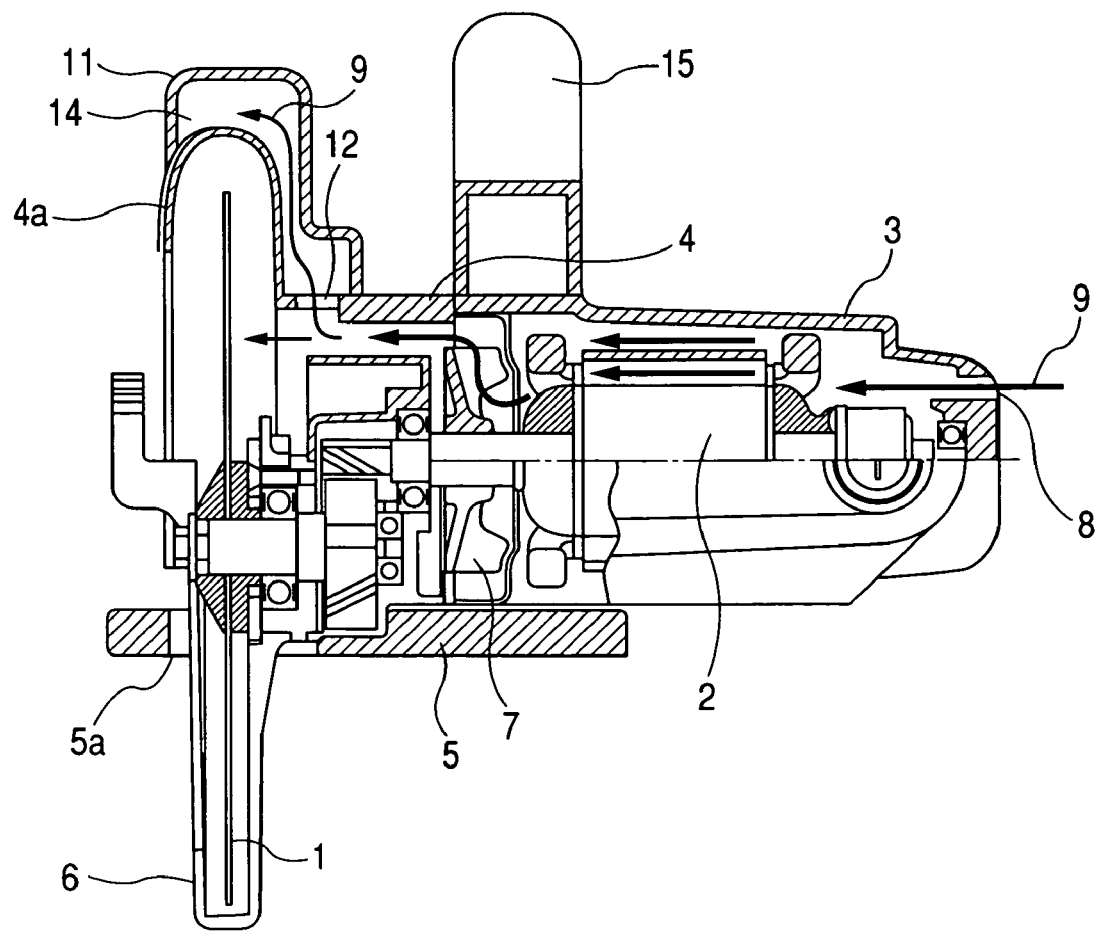
FIG. 5 is a broken side view of the portable circular saw according to the first embodiment of the invention.
Figure 6:
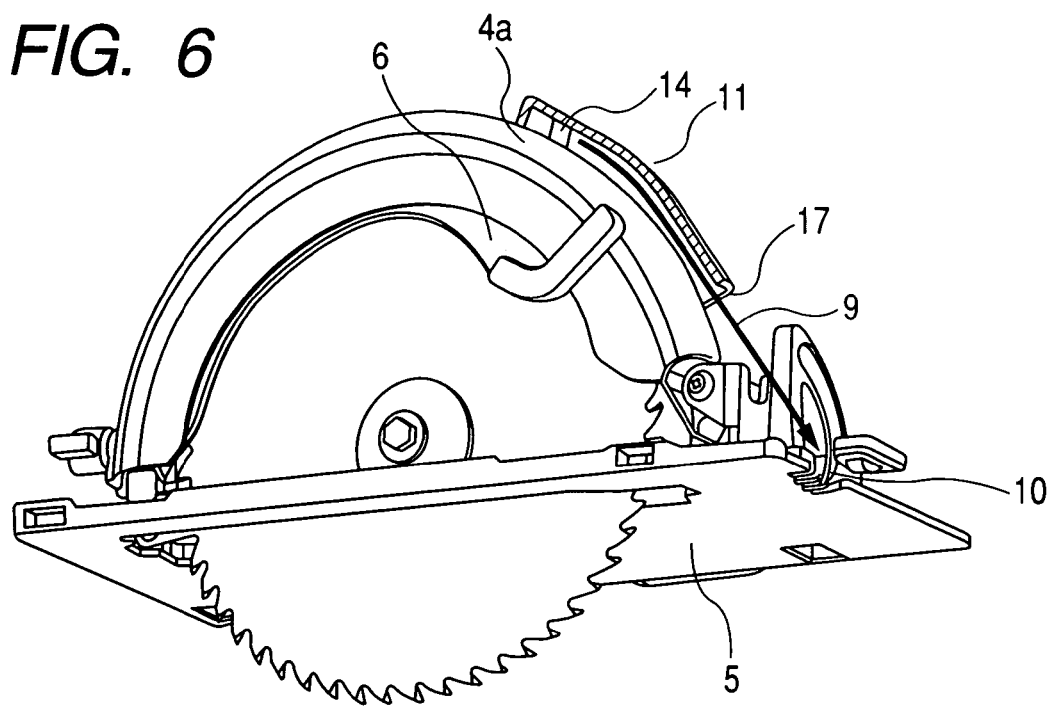
FIG. 6 is a front perspective view of the cover member of the portable circular saw according to the first embodiment of the invention with parts partially broken away.
Figure 7:
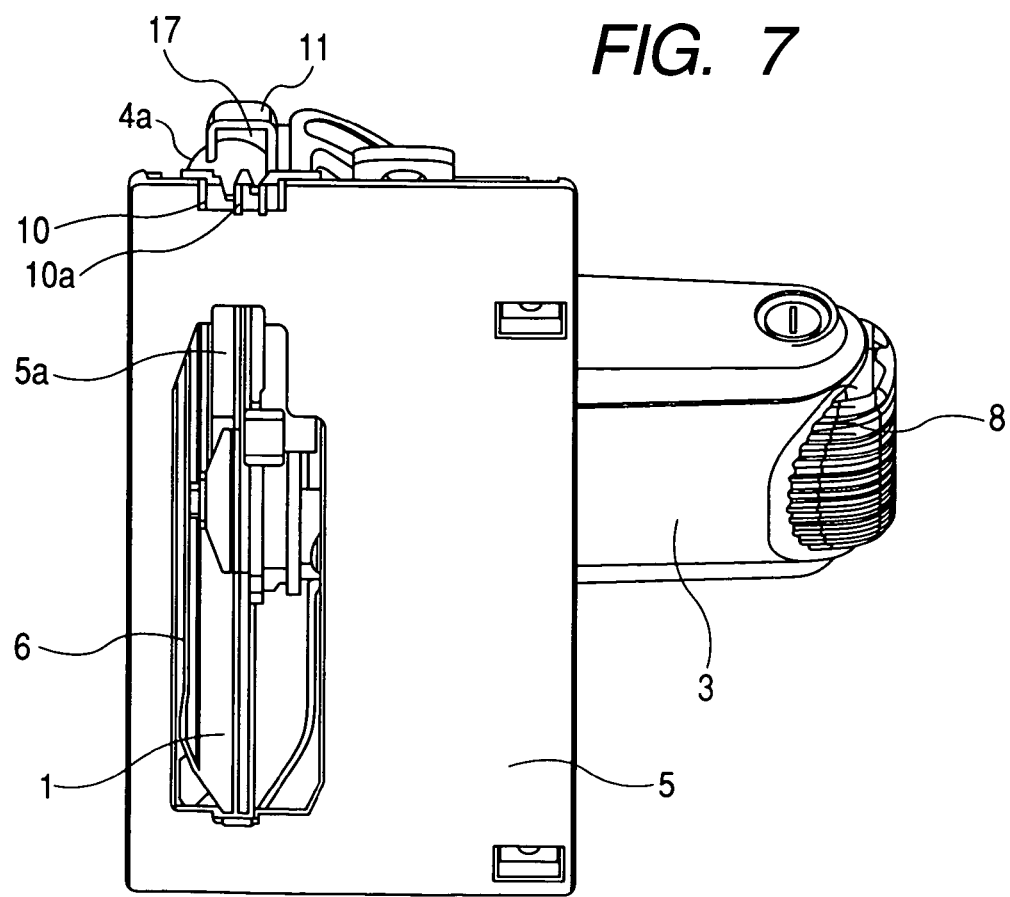
FIG. 7 is a bottom perspective view of the portable circular saw according to the first embodiment of the invention.

FIG. 1 is a perspective view of a portable circular saw according to a first embodiment of the invention, FIG. 2 is a perspective view to show a state in which a cover member of the portable circular saw is removed, FIG. 3 is a top perspective view of the cover member, FIG. 4 is a bottom perspective view of the cover member, FIG. 5 is a broken side view of the portable circular saw, FIG. 6 is a front perspective view of the cover member of the portable circular saw with parts partially broken away, and FIG. 7 is a bottom perspective view of the portable circular saw.

The portable circular saw according to the embodiment includes a saw blade 1, an electric motor 2 for rotating the saw blade 1, a motor housing 3 for housing the electric motor 2, a handle 15 projecting from the motor housing 3, a saw cover 4 for holding the saw blade 1 for rotation, and a base 5 placed below the motor housing 3 and the saw cover 4 and having an opening 5a for allowing the saw blade 1 to project from the lower face. The saw cover 4 is attached to the motor housing 3 and the base 5 is joined to the saw cover 4. In a saw blade housing part 4a of the saw cover 4 having a shape covering the roughly upper half of the outer periphery of the saw blade 1 for housing a part of the saw blade 1, a safety cover 6 having a shape covering the outer peripheral portion of the roughly semicircle part of the saw blade 1 is held so as to be able to rotate concentrically with the saw blade 1.

The power of the electric motor 2 is transferred to the saw blade 1 via a gear (not shown), etc., and the saw blade 1 is rotated at predetermined speed for performing required cutting work.

The saw cover 4 has the saw blade housing part 4a for holding the saw blade 1 for rotation and covering a part of the outer periphery of the saw blade 1 and a tubular part shaped roughly like a tube having an end face connected to the motor housing 3 for housing a gear (not shown), etc., in the tubular part. A discharge port 12 communicating with the inside is formed on the outer periphery of the tubular part of the saw cover 4, as shown in FIGS. 2 and 5.

On the other hand, a fan 7 for cooling the electric motor 2 is attached to the electric motor 2. When the electric motor 2 is driven, the fan 7 of a centrifugal fan rotates and fan wind 9 flowing into the inside of the motor housing 3 from a suction port 8 provided at the end part of the motor housing 3 on the opposite side to the saw cover 4 flows through the inside of the motor housing 3 for cooling the electric motor 2. The fan wind 9 supplied for cooling the electric motor 2 is discharged from the inside of the saw blade housing part 4a of the saw cover 4 and the discharge port 12 to the outside of the saw cover 4.

In the embodiment, a cover member 11 of a discharge passage forming member shown in FIGS. 3 and 4 is attached to the saw cover 4 by a screw 16 as shown in FIG. 1, and the discharge port 12 is opened in the cover member 11 as shown in FIG. 5.

The cover member 11 is formed as a shape along the outer wall of the saw cover 4 and is angular U-shaped (like a channel) in cross section. The cover member 11 and the outer wall of the saw cover 4 form a predetermined discharge passage 14 internally in a state in which the cover member 11 is attached to the saw cover 4 (see FIGS. 5 and 6).

One end of the cover member 11 (the right end part in FIG. 3, the lower end part in FIG. 4) is blocked and the vicinity of the one end has a shape covering the discharge port 12 of the saw cover 4 as shown in FIG. 5 in a state in which the cover member 11 is attached to the saw cover 4.

On the other hand, an opposite end of the cover member 11 (the lower end part in FIG. 3, the right end part in FIG. 4) is opened forming an open end part 17, which is opened upward on the front in the cutting direction as shown in FIGS. 1 and 6 in a state in which the cover member 11 is attached to the saw cover 4.

A part of the cover member 11 is positioned on the extension of the saw blade 1 in the length direction thereof above the saw blade housing part 4a of the saw cover 4 and extends in the length direction of the saw blade 1 as shown in FIGS. 1 and 6.

To fix the cover member 11 to the saw cover 4, a hole 11b is made in a fixing part 11a of the cover member 11 as shown in FIGS. 3 and 4, a tapped hole 13 is made in the saw cover 4 as shown in FIG. 2, and the screw 16 is screwed into the tapped hole 13 made in the saw cover 4 through the hole 11b of the fixing part 11a, as shown in FIG. 1.

The fan wind 9 discharged from the discharge port 12 of the saw cover 4 to the outside of the saw cover 4 passes through the discharge passage 14 in the cover member 11 and is discharged from the open end part 17 of the cover member 11. The fan wind 9 from the open end part 17 of the cover member 11 is discharged toward the front side of the base 5 in the cutting direction and blows off chips accumulated on the base 5 and the cut material ahead of the base 5.

A guide piece 10 having a guide part 10a for pointing to the cutting edge position of the saw blade 1 is installed at the front end part of the base 5 in the cutting direction, and the fan wind 9 is discharged into the range containing the guide part 10a.

As described above, according to the portable circular saw according to the invention, the discharge passage 14 of the fan wind 9 produced by driving the fan 7 is formed along the outer peripheral surface of the saw cover 4 and the fan wind 9 is discharged through the discharge passage 14 toward the front side of the base 5 in the cutting direction, so that the chips on the cut material on the front side of the base 5 in the cutting direction can be blown off without incurring degradation of the strength of the base 5 as a groove is formed on the bottom of the base 5; the viewability of a mark-off line on the cut material can be enhanced and the workability can be improved.

Improvement in the workability can be accomplished according to the simple configuration wherein the cover member 11 of a discharge passage forming member is attached to the saw cover 4, and the discharge passage 14 can be formed for providing the advantage described above with little requiring working on an already existing product.

Further, the cover member 11 of a discharge passage forming member is formed as the shape along the saw cover 4, so that a problem of the cover member 11 becoming an obstacle and degrading the viewability of the cutting edge of the saw blade 1 does not occur.

In the embodiment, the fan wind 9 is discharged into the saw blade housing part 4a and a part of the fan wind 9 is also discharged through the discharge port 12 into the discharge passage 14 for discharging the fan wind 9 into the saw blade housing part 4a, so that occurrence of noise caused by the fan wind 9 can be suppressed. However, the fan wind 9 may be discharged only into the discharge passage 14 in the cover member 11 without being discharged into the saw blade housing part 4*a*.

Wind amount adjustment means for adjusting the opening area of the discharge port 12 and wind amount adjustment means for adjusting the cross-sectional area of a part in the discharge passage 14 can also be provided for adjusting the wind amount of the fan wind 9 discharged toward the front end part of the base 5 in the cutting direction in response to the work state, etc., whereby the workability can be furthermore improved. In this case, the wind amount adjustment means are configured so as to able to block the opening area of the discharge port 12 and the cross-sectional area of a part in the discharge passage 14, so that discharge of the fan wind 9 from the discharge passage 14 can be regulated in work in the environment where blowing off chips is not desired, and the portable circular saw of good workability responsive to the work state, etc., can be provided.

Further, usually the portable circular saw has a configuration wherein the base 5 is inclined relative to the saw cover 4 or the motor housing 3 and the angle of the side of the saw blade 1 with respect to the bottom of the base 5 can be adjusted inclinably, namely, inclined cutting can be conducted. However, in the embodiment, the discharge passage 14 is placed on the extension of the saw blade 1 in the length direction thereof along the saw cover 4, so that the fan wind 9 is discharged to the front side in the cutting direction even at the inclined cutting time and chips on the mark-off line of a cut material can be blown off.

Since the discharge port 12 of the saw cover 4 is formed between the saw blade housing part 4*a* of the saw cover 4 and the root of the handle 15, the portion of the cover member 11 covering the discharge port 12 becomes behind the root of the handle 15 and does not hinder the worker from gripping the handle 15.

The portion of the cover member 11 covering the saw blade housing part 4*a* is also shaped like a circular arc as the saw blade housing part 4*a* of the saw cover 4 covers the cutting edge of the saw blade 1 as the outer wall shaped like a circular arc, so that the product does not fruitlessly become large.

In the embodiment, the discharge passage forming member is formed by the cover member 11 which is angular U-shaped in cross section so as to form the discharge passage 14 partitioned by the cover member 11 and the outer wall of the saw cover 4. However, the invention is not limited to it. Only the discharge passage forming member may form an internally partitioned discharge passage.

The saw cover 4 may form a part or all of the discharge passage, in which case it is desirable that the saw cover 4 should be of separation type.

Further, when the portable circular saw has a light for illuminating the front part in the cutting direction or the cutting edge of the saw blade 1 at the front in the cutting direction and a light holder for holding the light, if the light holder is made to also serve as the function forming the discharge passage, the workability can be more improved without increasing the number of parts.

On the other hand, in the embodiment, the cover member 11 of the discharge passage forming member is fixed to the saw cover 4 by the screw 16. However, the cover member 11 may be fixed without using any screw in such a manner that the cover member 11 is fixed to a product with an adhesive or that the saw cover 4 is formed with a fit part into which the cover member 11 is fitted for fixing the cover member 11.

Second Embodiment

A second embodiment of the invention will be discussed with FIGS. 8 to 10.

Figure 8:
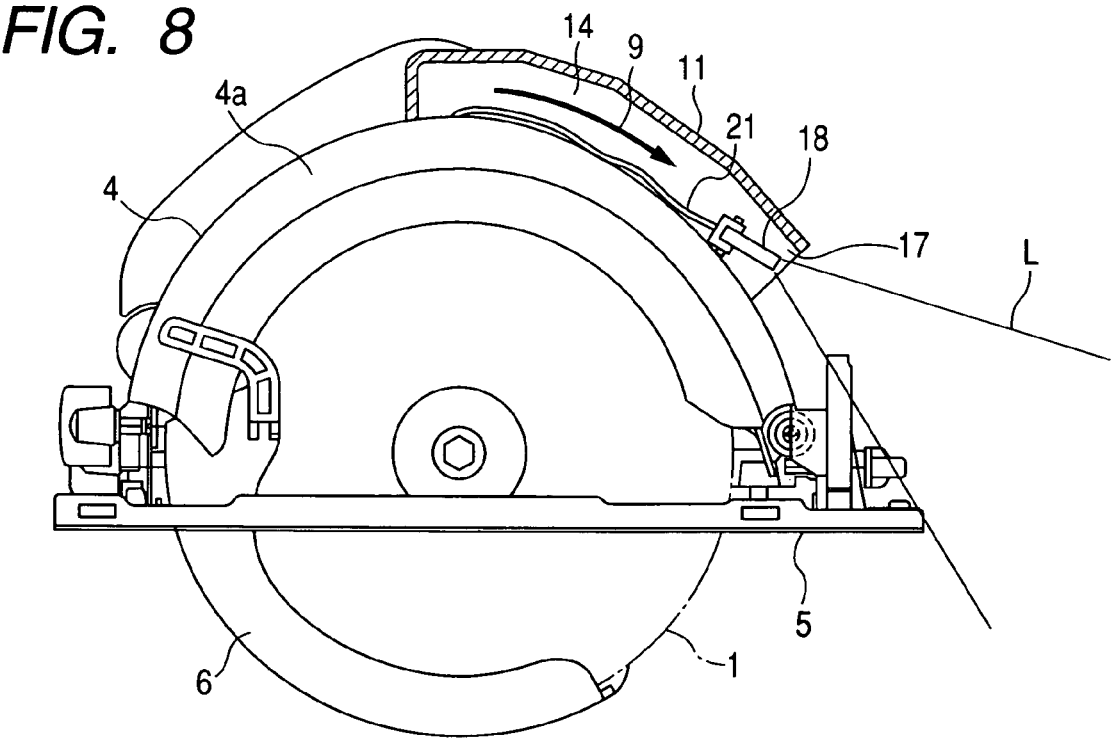
FIG. 8 is a side view of a cover member of a portable circular saw according to a second embodiment of the invention with parts partially broken away.
Figure 9:
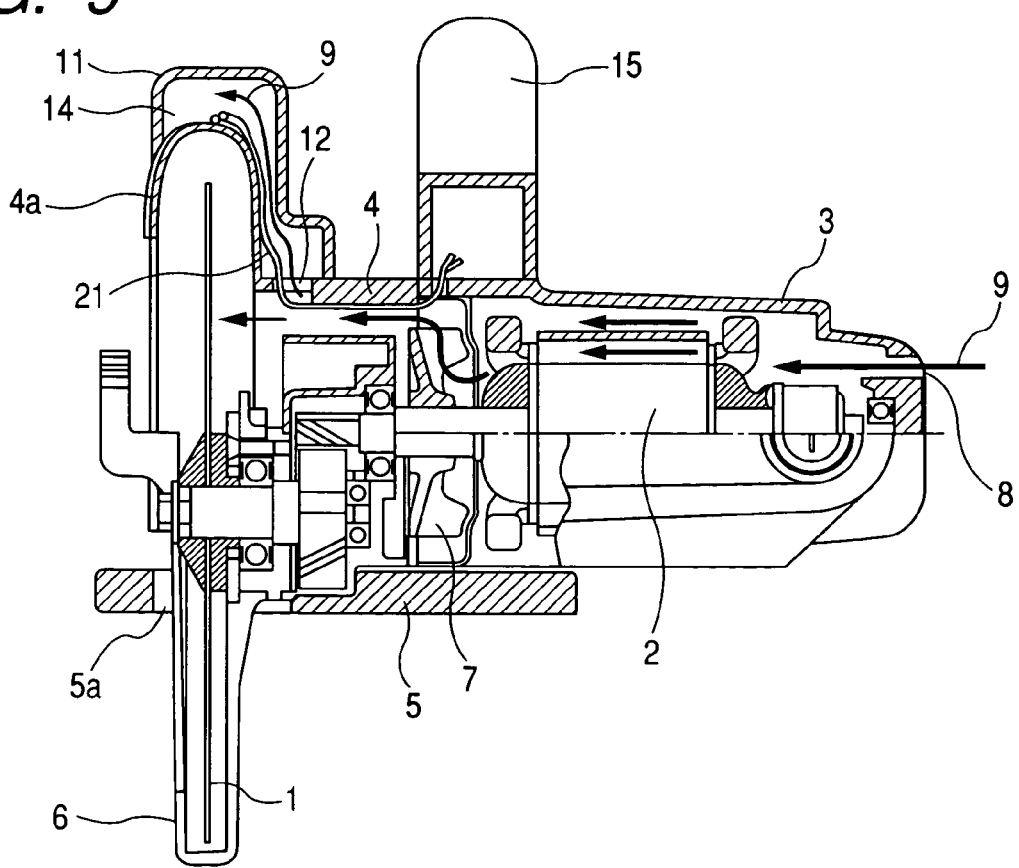
FIG. 9 is a broken side view of the portable circular saw according to the second embodiment of the invention.
Figure 10:
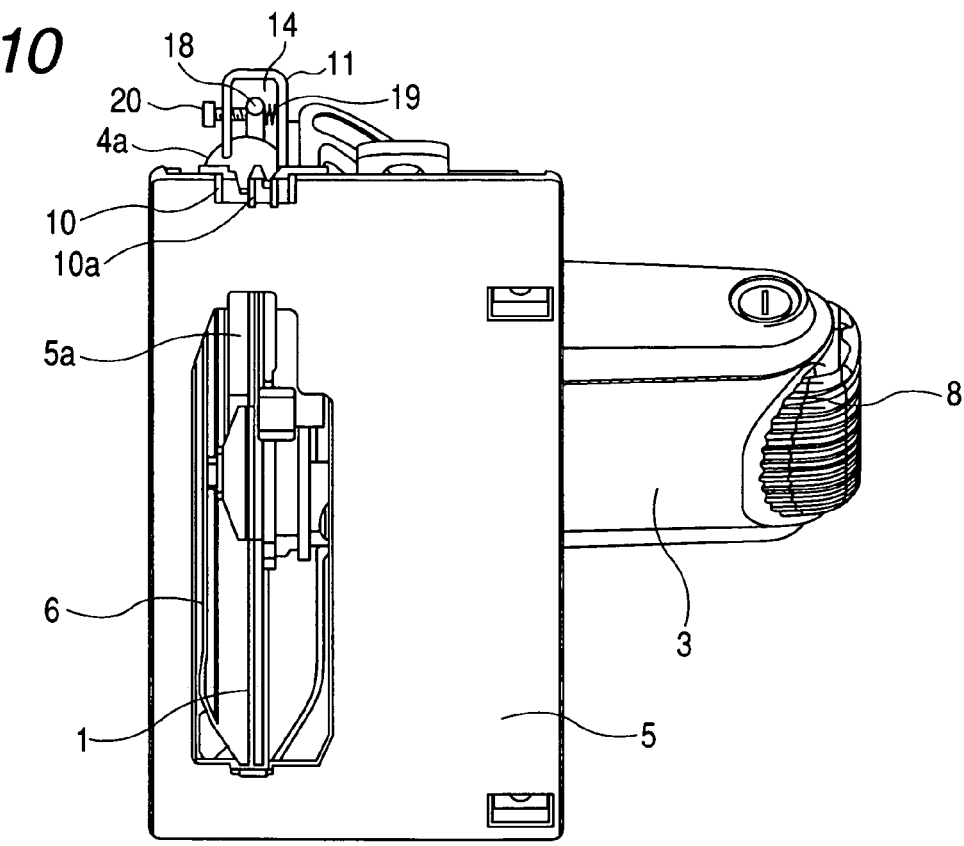
FIG. 10 is a bottom view of the portable circular saw according to the second embodiment of the invention.

FIG. 8 is a side view of a cover member of a portable circular saw with parts partially broken away according to the second embodiment of the invention, FIG. 9 is a broken side view of the portable circular saw, and FIG. 10 is a bottom view of the portable circular saw. Parts identical with those previously described with reference to FIGS. 1 to 7 are denoted by the same reference numerals in FIGS. 8 to 10 and will not be discussed again.

The portable circular saw according to the embodiment is characterized in that a laser oscillator 18 for emitting laser light L for guiding cutting toward the front side of a cut material in the cutting direction thereof is placed in a discharge passage 14 in a cover member 11, as shown in FIGS. 8 and 10, and other components are the same as those of the portable circular saw according to the first embodiment.

Since the laser light L emitted from the laser oscillator 18 shows a high rectilinear propagation property, the laser oscillator 18 is placed at a position where the laser light L is applied onto the extension of cutting a cut material, specifically a position overlapping a saw blade 1 (position on the plane parallel to the end face of the saw blade 1. The width direction position of the laser oscillator 18 in the discharge passage 14 can be adjusted. That is, as shown in FIG. 10, the laser oscillator 18 is urged in the width direction (to the left in FIG. 10) by a spring 19 and has an end face received by an adjustment bolt 20 screwed into a side of the cover member 11. Therefore, the adjustment bolt 20 is turned and is backed off in the discharge passage 14, whereby the width direction position of the laser oscillator 18 in the discharge passage 14 can be adjusted. A lead wire 21 for supplying an electric current to the laser oscillator 18 extends through a discharge port 12 formed on a saw cover 4 to the discharge passage 14 in the cover member 11, and has an end part connected to the laser oscillator 18, as shown in FIG. 9.

The portable circular saw according to the embodiment also provides similar advantages to those of the portable circular saw according to the first embodiment. In the second embodiment, the laser oscillator 18 is placed in the discharge passage 14 as described above, so that the laser oscillator 18 is exposed to fan wind 9 flowing through the discharge passage 14 and chips are hard to be deposited on the laser oscillator 18 and consequently the cut portion on the cut material can be kept in a state in which the viewability is good.

Since the laser oscillator 18 is cooled by the fan wind 9, heat generation of the laser oscillator 18 is suppressed and degradation of the intensity of the laser oscillator 18 is prevented. Since degradation of the intensity of the laser oscillator 18 is prevented, the intensity required for the laser oscillator 18 is decreased, so that the power consumption can be decreased for power saving and an inexpensive laser oscillator having a low heatresistant temperature can be used as the laser oscillator 18 to reduce the cost. To use a battery as the power source of the laser oscillator 18, the battery life can be prolonged because of power saving.

By the way, in the embodiment, the laser oscillator is used as the light emission part for applying light for guiding cutting toward the front side of a cut material in the cutting direction, but an LED light emission part may be used in place of the laser oscillator. Since LED light has a lower rectilinear propagation property than laser light and the application range of the LED light has a margin of width, the installation position of the LED light emission part may be less strict than that of the laser oscillator and may deviate a little in the width direction from the position overlapping the saw blade.

In the embodiment, the laser oscillator 18 is placed in the discharge passage 14, but if the laser oscillator 18 is placed in the discharge passage of the fan wind 9 outside the discharge passage 14, a similar advantage to that described above can be provided.

Third Embodiment

Figure 11:
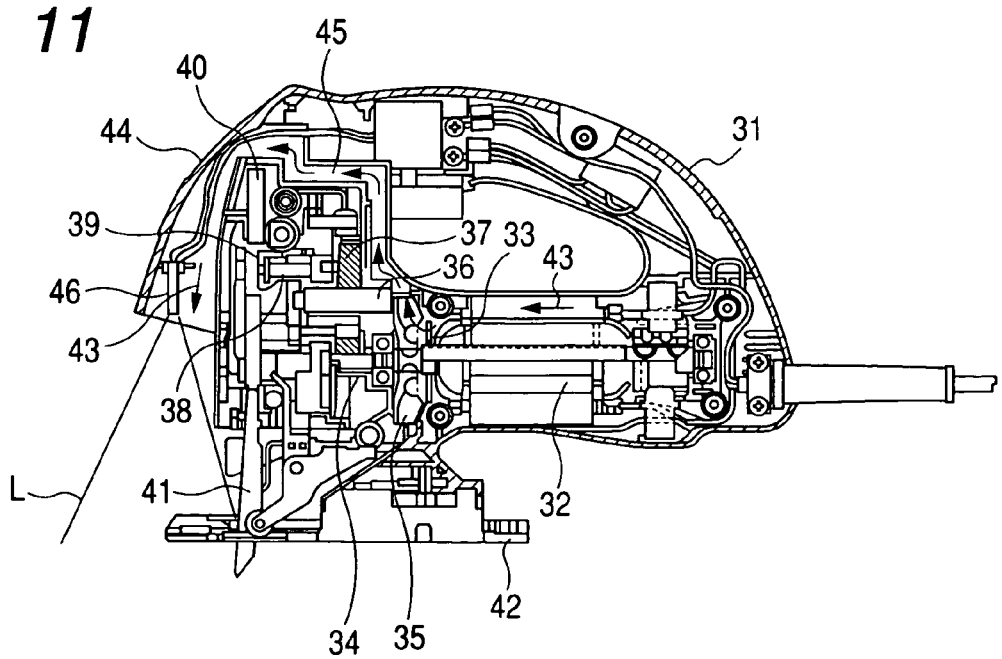
FIG. 11 is a sectional side view of a jig saw according to a third embodiment of the invention.
Figure 12:
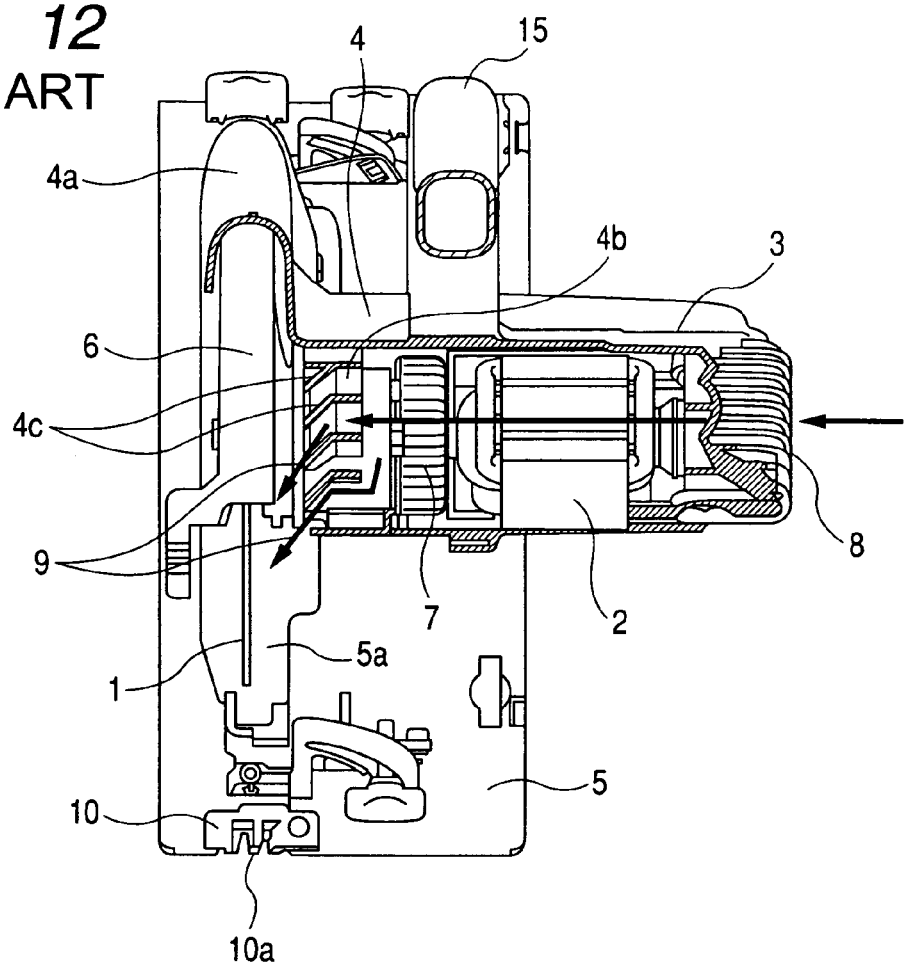
FIG. 12 is a broken plan view of a portable circular saw in a related art.
Figure 13:
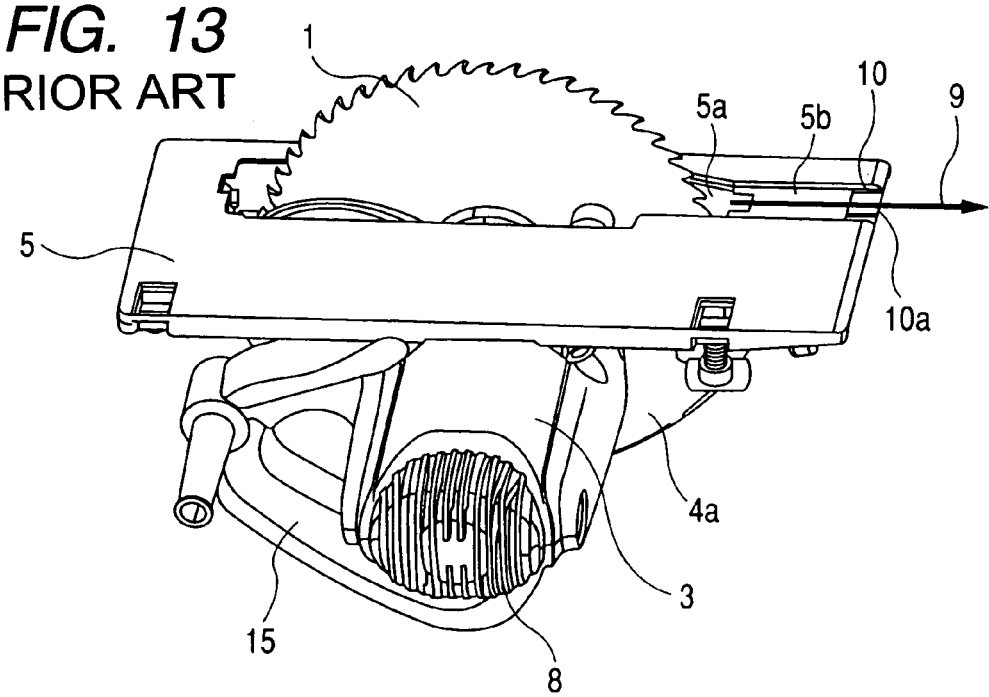
FIG. 13 is a bottom perspective view of the portable circular saw on the rear thereof in the related art.

Next a third embodiment of the invention will be discussed with FIG. 11. FIG. 11 is a sectional side view of a jig saw according to the third embodiment of the invention.

The embodiment is provided by applying the invention to a jig saw. To begin with, the basic configuration and function of the jig saw will be discussed below:

An electric motor 32 as a drive source is housed as transversely mounted in a housing 31 of a jig saw shown in the figure, a pinion 34 is placed at one end of an output shaft (motor shaft) 33 of the electric motor 32 in one piece, and a fan 35 is attached onto the output shaft inside the pinion 34.

A shaft 36 is placed above and in parallel with the output shaft 33 of the electric motor 32 in the housing 31 and a gear 37 is supported on the shaft 36 for rotation and meshes with the pinion 34 formed at the end of the output shaft 33. A pin 38 eccentric with respect to the shaft 36 is attached to the gear 37 and engages a sleeve guide 39.

The sleeve guide 39 is held in the housing 31 up and down reciprocatably and is attached to a plunger 40, and the upper end of a blade 41 long in the length direction is detachably attached to the plunger 40. The blade 41 passes through an opening (not shown) made in a base 42 attached horizontally to the bottom of the housing 31 and extends downward from the bottom face of the base 42.

When the electric motor 32 is driven, rotation of the output shaft 33 is slowed down through the pinion 34 and is transferred to the gear 37, which then rotates at predetermined speed with the shaft 36 as the center. The rotation of the gear 37 is converted into up and down reciprocating linear motion of the plunger 40 and the blade 41 jointed thereto by eccentric motion of the pin 38. Therefore, if the jig saw is moved with the base 42 placed on a cut material (not shown), the cut material is cut by the blade 41 making up and down reciprocating linear motion. At this time, the fan 35 attached to the output shaft 33 of the electric motor 32 is driven and fan wind 43 produced by the fan 35 flows through the inside of the housing 31 in the arrow direction in the figure, cooling the electric motor 32.

By the way, also in the jig saw according to the embodiment, a discharge passage 45 for discharging a part of the fan wind 43 toward the front side of the base 42 in the cutting direction is formed in the housing 31 and between the housing 31 and a cover member 44 attached thereto, and a laser oscillator 46 for applying laser light L for guiding cutting toward the front side of a cut material in the cutting direction thereof is placed in the discharge passage 45 and in the vicinity of opening.

Therefore, also in the jig saw according to the embodiment, a part of the fan wind 43 supplied for cooling the electric motor 32 flows through the discharge passage 45 in the arrow direction in the figure and is discharged toward the front side of the base 42 in the cutting direction, so that the chips on the cut material on the front side of the base 42 in the cutting direction can be blown off without incurring degradation of the strength of the base 42 as a groove is formed on the bottom of the base 42; the viewability of a mark-off line on the cut material can be enhanced and the workability can be improved.

As with the second embodiment described above, the laser oscillator 46 is placed in the discharge passage 45, so that chips are hard to be deposited on the laser oscillator 46 and the cut portion on the cut material can be kept in a state in which the viewability is good. Further, since the laser oscillator 46 is cooled by the fan wind 43, heat generation of the laser oscillator 43 is suppressed and degradation of the intensity of the laser oscillator 43 is prevented. In addition, the power consumption can be decreased for power saving and an inexpensive laser oscillator having a low heatresistant temperature can be used as the laser oscillator 46 to reduce the cost.

In the embodiment, the laser oscillator is used as the light emission part for applying light for guiding cutting toward the front side of a cut material in the cutting direction, but an LED light emission part may be used in place of the laser oscillator.

In the embodiment, the laser oscillator 46 is placed in the discharge passage 45, but if the laser oscillator 46 is placed in the discharge passage of the fan wind 43 outside the discharge passage 45, a similar advantage to that described above can be provided.

INDUSTRIAL APPLICABILITY

The invention can be applied to any desired portable electric cutting apparatus of a portable circular saw, a portable jig saw, etc., adopting a system for cooling an electric motor housed in a housing by fan wind produced by driving a fan.

What is claimed is:

1. A portable electric cutting apparatus comprising:
a housing for housing an electric motor rotating a saw blade;
a saw cover attached to the housing, the saw cover having a shape to cover an upper half of an outer periphery of the saw blade,
the saw cover including:
a saw blade housing portion at least partially housing the saw blade; and
a cylindrical portion having a substantially cylindrical shape, and the cylindrical portion connecting to the housing at an end face of the cylindrical portion;
a base being joined to at least one of the saw cover and the housing, the base having an opening to allow the saw blade to project downward from a bottom face which is slidable on a cut material; and
a fan being provided in the housing, and the fan being driven by the electric motor,
wherein a discharge passage forming member is provided on an outer periphery of the saw cover so as to form a discharge passage,
wherein a fan wind generated by driving the fan flows into the cylindrical portion of the saw cover,
wherein one part of the fan wind is discharged toward within the saw blade housing portion through the cylindrical portion of the saw cover,
wherein another part of the fan wind is discharged toward a discharge port which is formed on an outer periphery of the cylindrical portion of the saw cover, and
wherein the fan wind discharged from the discharge port is discharged toward a front side of the base in a cutting direction through the discharge passage formed inside of the discharge passage forming portion.

2. The portable electric cutting apparatus according to claim 1, wherein the discharge passage is at least partially positioned on an extension line along a longitudinal direction of the saw blade, and
wherein the fan wind discharged from the discharged passage is discharged toward the extension line along the longitudinal direction of the saw blade.

3. The portable electric cutting apparatus according to claim 1, wherein the discharge passage forming member is configured by a cover member which forms the discharge passage with an outer peripheral face of the saw cover.

4. The portable electric cutting apparatus according to claim 1, wherein a guide portion indicating a position of an edge of the saw blade is provided with a front end of the base in a cutting direction,
wherein the discharge passage forming member is positioned behind the guide portion in the cutting direction.

5. The portable electric cutting apparatus according to claim 1, wherein
the discharge passage forming member for forming the discharge passage is attached to the saw cover.

6. The portable electric cutting apparatus according to claim 5, wherein
the discharge passage forming member is attached to the saw cover so as to at least partially cover a fan wind discharge port formed on an outer peripheral part of the saw cover.

7. The portable electric cutting apparatus according to claim 5, wherein
the discharge passage forming member is configured by a cover member which forms the discharge passage with an outer peripheral surface of the saw cover.

8. The portable electric cutting apparatus according to claim 1, wherein
a part of the discharge passage is formed by extending the discharge passage onto an extension in length direction of the saw blade.

9. The portable electric cutting apparatus according to claim 1, wherein
the fan wind discharged through the discharge passage is discharged from a front end of the base in the cutting direction toward a front side.

* * * * *